US006635206B1

(12) United States Patent
Padua et al.

(10) Patent No.: US 6,635,206 B1
(45) Date of Patent: Oct. 21, 2003

(54) METHOD OF MANUFACTURING IMPROVED CORN ZEIN RESIN FILMS, SHEETS, AND ARTICLES

(75) Inventors: Graciela Wild Padua, Champaign, IL (US); Andrianaivo Maherisoa Rakotonirainy, Antananarivo (MG); Toan Thanh Ha, Can Tho (VN)

(73) Assignee: The Board of Trustees of the University of Illinois, Urbana, IL (US)

( * ) Notice: Subject to any disclaimer, the term of this patent is extended or adjusted under 35 U.S.C. 154(b) by 0 days.

(21) Appl. No.: 09/563,881

(22) Filed: May 3, 2000

(51) Int. Cl.$^7$ .......................... B29B 9/02; B29B 11/10; B29B 11/12; B29C 55/00

(52) U.S. Cl. .................. 264/115; 264/118; 264/119; 264/176.1; 264/280; 264/291; 264/340; 264/141

(58) Field of Search ................... 264/517, 291, 264/319, 171.25, 141, 142, 109–128, 176.1, 280, 340

(56) References Cited

U.S. PATENT DOCUMENTS

| | | | |
|---|---|---|---|
| 4,543,370 A | 9/1985 | Porter et al. ............... 523/100 |
| 5,182,130 A | 1/1993 | Haralampu et al. ........... 427/3 |
| 5,188,842 A | 2/1993 | Visser et al. ............... 424/535 |
| 5,393,333 A | 2/1995 | Trouve ....................... 106/149 |
| 5,523,293 A | 6/1996 | Jane et al. .................... 514/21 |
| 5,543,164 A | 8/1996 | Krochta et al. ............. 426/302 |
| 5,585,060 A | 12/1996 | Takahashi et al. .......... 264/204 |
| 5,922,379 A * | 7/1999 | Wang ......................... 426/138 |
| 6,379,725 B1 * | 4/2002 | Wang et al. .................. 426/72 |

FOREIGN PATENT DOCUMENTS

| | | | |
|---|---|---|---|
| GB | 2214920 | 9/1989 | ............ C08L/3/02 |
| JP | 06 192577 A | 7/1994 | .......... B65D/65/46 |

OTHER PUBLICATIONS

Santosa et al., Tensile Properties and Water Absorption of Zein Sheets Plasticized with Oleic and Linoleic Acids, "Journal of Agriculture and Food Chemistry" v. 47, pp. 2070–2074, Apr. 30, 1999.*

G. W. Padua et al., Biodegradable plastics, Biobased products Expo '04, (1994).

G.W. Padua, Biodegradable resins from corn by–products, Presentation to AOSCA 6th Annual Identity Preserved Crops Conference (1995).

M. Masco–Arriola, Preparation and evaluation of biodegradable plastics derived from corn zein, M.S. Thesis, University of Illinois (1996).

H.M. Lai, Preparation of zein–based biodegradable materials and the investigation of their physical properties, Ph.D. Thesis, University of Illinois (1997).

G.W. Padua et al., Properties of biodegradable plastics derived from corn proteins, Proceedings from the Third Biomass Conference of the Americas, Montreal, Canada, Aug. 24–29, 1997.

H.M. Lai et al., Development of corn zein–based biodegradable resins, Book of Abstracts (53C–8), Institute of Food Technologists Annual Meeting, New Orleans, LA (1996).

H.M. Lai et al., Effect of processing method of water barrier properties of zein–based films, Book of Abstracts (77–4), Institute of Food Technologists Annual Meeting, Orlando, FL (1997).

(List continued on next page.)

Primary Examiner—Stephen J. Lechert, Jr.
(74) Attorney, Agent, or Firm—Greer, Burns & Crain, Ltd.

(57) ABSTRACT

A method of manufacturing sheets, films, and articles of manufacture from a corn zein resin. A wet corn zein resin is formed including corn zein and a fatty acid, and the wet zein resin is cold rolled into sheets. The sheets are dried, and the dried zein resin is processed to form sheets, films, and/or articles of manufacture.

28 Claims, 1 Drawing Sheet

OTHER PUBLICATIONS

F.X.B. Santosa et al., Effect of fatty acid content on tensile properties of zein–based biodegradable resin sheets, Book of Abstracts (69A–10), Institute of Food Technologists Annual Meeting, Orlando, FL (1997).

T. Ha et al., Extrusion processing of zein–based biodegradable plastics, Abstracts from the Sixteenth Annual Midwest Food Processing Conference, IFT Regional Conference, LaCrosse, WI (1997).

F.X.B. Santosa et al., Tensile and water absorption properties of zein–fatty acid biodegradable resins, Abstracts from the Sixteenth Annual Midwest Food Processing Conference, IFT Regional Conference, LaCrosse, WI (1997).

T. Ha et al., Extrusion processing of zein–based biodegradable plastics, Book of Abstracts (59E–15), Institute of Food Technologists Annual Meeting, Atlanta, GA (1998).

F.X.B. Santosa, Thermal behavior of zein sheets plasticized with oleic and linoleic acids, Book of Abstracts (59E–16), Institute of Food Technologists Annual Meeting, Atlanta, GA (1998).

H.M. Lai et al., Structure characterization of biodegradable zein resin films by x-ray diffraction, Book of Abstracts (77B–45), Institute of Food Technologists Annual Meeting, Atlanta, GA (1998).

J.L. Kanig et al., *J. Pharm. Sci.,* 51(*1*), p. 77–83 (1962).

H.M. Lai et al., Properties and microstructure of plasticized zein films, *Cereal Chemistry,* vol. 74(6), pp. 771–775 (1997).

M.L. Masco–Arriola et al., Plasticization of corn zein with unsaturated fatty acids, Paper submitted to Dept. of Food Science and Human Nutrition, University of Illinois (1997).

H.J. Lai et al., Water vapor barrier properties of zein films plasticized with oleic acid, *Cereal Chemistry* 75(*2*), pp. 194–199 (1998).

H–M. Lai et al., Properties and microstructure of zein sheets plasticized with palmitic and stearic acids, *Cereal Chemistry.*, vol. 74, No. 1, pp. 83–90 (1997).

J.M. Krochta et al., Edible and biodegradable polymer films: challenges and opportunities, *Food Technology,* vol. 51, No. 2, pp. 61–74 (1997).

C. Andres (ed.), Edible films have potential for significantly improving aesthetic and nutritional content of foods, *Food Processing,* pp. 102–130 (1985).

C. Andres (ed.), Natural edible coating has excellent moisture and grease barrier properties, *Food Processing,* pp. 48–49 (Dec. 1984).

A. Gennadios et al., Edible films and coatings from wheat and corn proteins, *Food Technology,* pp. 63–69 (1990).

A. Gennadios et al., Property modification of edible wheat, gluten–based films, *American Society of Agricultural Engineers,* vol. 36(2), pp. 465–470 (1993).

H.J. Park et al., Properties of edible coatings for fruits and vegetables, Paper presented to the American Society of Agricultural Engineers (1990).

M. Anker, Edible and biodegradable films and coatings for food packaging—a literature review, Part of a Ph.D. work at the Department of Food Science, Chalmers University of Technology, Sweden (1996).

H–M. Lai et al., X–ray diffraction characterization of the structure of zein–oleic acid films, *Journal of Applied Polymer Science,* vol. 71, pp. 1267–1281 (1999).

J.W. Park et al., Fatty acid concentration effect on tensile strength, elongation, and water vapor permeability of laminated edible films, *Journal of Food Science,* vol. 59(4), pp. 916–919 (1994).

M.T. Izzo et al., Protein–lipid interaction during singlescrew extrusion of zein and corn oil, *Cereal Chemistry,* vol. 66(1), pp. 47–50 (1989).

K.E. Spence et al., Dialdehyde starch and zein plastic: mechanical properties and biodegradability,*Journal of Environmental Polymer Degradation,* vol. 3(2), pp. 69–74 (1995).

R.A. Reiners et al., Corn proteins: potential for their industrial use, "Industrial Uses of Cereal," *Am. Assoc. of Cereal Chemists,* St. Louis, MO, pp. 285–298 (undated).

Food proteins and their applications, S. Damodaran, ed., pp. 529–549 (1997).

* cited by examiner

FIG. 1

METHOD OF MANUFACTURING IMPROVED CORN ZEIN RESIN FILMS, SHEETS, AND ARTICLES

FIELD OF THE INVENTION

The present invention relates to a method of manufacturing articles from a resin comprising corn zein and a fatty acid. More particularly, the present invention relates to a method of manufacturing articles, such as sheets, films, and formed products, from a biodegradable corn zein resin. The zein resin-based articles exhibit improved physical and esthetic properties, and can be used as articles of manufacture for use in commercial applications, like agricultural and food packaging applications.

BACKGROUND OF THE INVENTION

Environmental concerns related to the nondegradable, petroleum-based plastics used in the production of packaging and disposable consumer goods has fostered research in the area of biodegradable materials for packaging and other articles of manufacture. Several biodegradable, biological polymers have been investigated because of their film-forming capabilities. Three major types of biodegradable products are derived from starch, from fermentation of sugars to polyesters, i.e., poly-(3-hydroxybutyrate)-co-(3-hydroxyvalerate), and from synthetic lactic acid polymers.

For example, starch-based resins have been converted into compost bags, disposable food-service items (e.g., cutlery, plates, and cups), packaging materials (e.g., loosefill and films), coatings, and other speciality items. However, a major disadvantage of the starch-based materials is moisture sensitivity due to the hygroscopic nature of starch.

Inexpensive, renewable, and abundant plant proteins constitute a viable source of biodegradable polymers. Accordingly, plant protein-based biodegradable polymers have been studied as potential biodegradable materials for packaging and other disposable consumer goods. For example, a transparent sheet having acceptable strength and biodegradability has been prepared from wheat gluten. Starch mixed with zein has been used in molding applications, in part because the biodegradability of zein is about equal to that of starch.

Corn zein, therefore, has been investigated for use as a structural material in packaging applications to take advantage of the unique properties of zein. For example, corn zein has been used as a base material to produce biodegradable sheets.

Zein is the prolamine in corn, and is an abundant protein in corn gluten meal, which is a coproduct of corn wet milling. Corn gluten meal contains about 70% protein (dry base) with zein amounting to 60% of that protein.

Zein is located in small round particles, 1–2 $\mu$m in diameter, called protein bodies in maize endosperm. Three distinct fractions, $\alpha$, $\beta$, and $\gamma$ zein, have been identified by differential solubility in aqueous alcohol solutions. Native zein is a mixture of proteins that differ in molecular size, solubility, and charge.

Zein is separated from the corn gluten meal by solvent extraction, usually with isopropanol. The extract is clarified centrifugally, then chilled to precipitate the zein. Additional extractions and precipitations increase zein purity. The zein then is dried to a powder.

Approximately 80% of native zein is soluble in 95% ethanol, with the remainder soluble in 60% ethanol. These two fractions are designated $\alpha$-zein and $\beta$-zein, respectively. $\beta$-Zein consists of disulfide-crosslinked $\alpha$-zein. The reducing environment of the steeping process in corn wet milling cleaves disulfide bonds, leaving-essentially only $\alpha$-zein in commercial corn gluten and zein. $\alpha$-Zein is a polypeptide having a molecular weight about 21,000 to about 25,000.

Zein is a unique material in terms of thermoplasticity and hydrophobicity. When zein is heated with starch above 60° C., the mixture becomes a dough and exhibits viscoelastic behavior. The moldable properties of zein classify zein as a plastic, i.e., a polymeric material capable of flowing under applied pressure or heat. The hydrophobic nature of zein is related to its high content of nonpolar amino acids. Because of this hydrophobic property, zein has been used in the food and pharmaceutical industries as coating material for candies, rice, dried fruits, and nuts. Zein also has been used in the pharmaceutical industry to coat capsules for protection, controlled release, and masking of flavors and aromas. Zein possesses the additional benefits of being renewable and biodegradable.

Zein also has been investigated for use as a structural material in packaging applications because of its film-forming properties. In particular, zein forms tough, glossy, scuff-proof, grease-proof films or coatings that are resistant to microbial attack. Zein also has an ability to cure with formaldehyde to provide an essentially inert product. A zein coating, therefore, can function as an oxygen, lipid, and moisture barrier.

Zein-based coatings have been used in numerous applications, for example, to extend the shelf life of almonds, peanuts, pecans, and walnuts. Similarly, zein-based coatings have protected confectioneries, dried fruits, and dried vegetables from moisture absorption, oxidation, and/or lipid migration. Zein coatings also have been used to coat vitamin-enriched rice, thereby reducing or eliminating vitamin loss. A zein-based coating also was used to maintain a high concentration of sorbic acid at the surface of an intermediate-moisture food, and to reduce moisture and firmness loss and delay a color change (i.e., reduce oxygen and carbon dioxide transmission) in fresh tomatoes.

A typical method of producing a zein-based film or coating involves solubilizing the zein in an aqueous alcohol solution, then casting the zein-containing alcohol solution on an inert, flat surface. After the water and alcohol evaporate, a tasteless and glossy film remains. The film then is peeled from the flat surface and used for its intended purpose. Typical disadvantages of zein films formed by casting are the control of film thickness and homogeneity in properties.

Cast films thus formed are very tough and resistant to grease. However, the cast films also are brittle and require the addition of plasticizers to impart flexibility and reduce the possibility of film chipping, cracking, and shattering. Commonly used plasticizers present in zein films include, for example, glycerin, triethylene glycol, fatty acids (like oleic, stearic, and palmitic acid), glycol monoesters, acetylated monoglycerides, dibutyl tartrate, lactic acid, and tricresyl phosphate.

An alternative method of preparing zein films involves plasticization of zein by forming an emulsion with oleic acid, followed by precipitation of the zein-oleic acid mixture to form a soft moldable resin. The dough-like resin then is stretched over rigid frames to obtain thin membranes that set into flexible films, that are ductile and tough. Microstructure images of the films showed a high degree of structural development consisting of fibers and ribbon-like protein structures that are theorized as responsible for the flexibility and toughness of the films.

Another method of preparing zein-based films utilizes corn zein plasticized with palmitic or stearic acid. Using these ingredients, a moldable zein resin was prepared, then cold-rolled into sheets about 0.5 mm thick. Such cold-rolled sheets are too thick for use in many practical applications. Typically, zein films are preferred for practical applications. As used herein, a "film" is defined as having a thickness of about 250 μm (microns) or less. A "sheet" is defined as having a thickness greater than about 250 μm.

Zein films exhibit relatively good water vapor barrier properties compared to other biodegradable, edible films, but are inferior compared to low density polyethylene (i.e., LDPE) and hydrolyzed ethylene-vinyl acetate (i.e., EVOH). Zein films also have a water vapor permeability (WVP) about equal to or lower than films made from cellophane, methylcellulose, ethylcellulose, ethylcellulose-polyvinylpyrrolidone, hydroxypropylmethylcellulose, and hydroxypropylcellulose, under similar test conditions. The WVP of zein films increases with increasing plasticizer level and relative humidity surrounding the film. Zein sheets plasticized with palmitic or stearic acids provide sturdy films having low water absorption compared to films made from other biological polymers.

The following publications are directed to zein, plasticized zein, and zein resins, and to methods of preparing films from such materials:

G. W. Padua, "Biodegradable plastics from corn proteins," Biobased products Expo '04, Kansas City, Mo. (1994).

G. W. Padua, "Biodegradable Resins from Corn By-Products," Presentation to AOSCA 6th Annual Identity preserved Crops Conference, Chicago, Ill. (1995).

M. Masco-Arriola, "Preparation and Evaluation of Biodegradable Plastics Derived from Corn Zein," M. S. Thesis University of Illinois, (1996).

H. M. Lai, "Preparation of Zein-Based Biodegradable Materials and the Investigation of their Physical Properties," Ph.D. Thesis University of Illinois (1997).

H. M. Lai et al., Cereal Chem., 74, pp. 83–90 (1997).

H. M. Lai et al., Cereal Chem., 74, pp. 771–775 (1997).

H. M. Lai et al., Cereal Chem., 74, pp. 194–199 (1997).

H. M. Lai et al., J. Appl. Polymer Sci., 71, pp. 1267–1281 (1999).

G. W. Padua et al., "Properties of biodegradable plastics derived from corn proteins," Proceedings from the Third Biomass conference of the Americas, Montreal, Canada, Aug. 24–29, 1997. Ed. R. P. Overend and E. Chronet Elsevier Science, Tarrytown, N.Y. (1997).

H. M. Lai et al., "Development of corn zein-based biodegradable resins," Book of Abstracts, Institute of Food Technologists Annual Meeting, New Orleans, La. (1996).

H. M. Lai et al., "Development of corn zein-based biodegradable sheets," Abstracts from the Fifteenth Midwest Food Processing Conference, LaCrosse, Wis. (1996).

H. M. Lai et al., "Effect of processing method on water barrier properties of zein-based films," Book of Abstracts, Institute of food Technologists Annual Meeting, Orlando, Fla. (1997).

F. X. Santosa et al., "Effect of fatty acid content on tensile properties of zein-based biodegradable resin sheets," Book of Abstracts, Institute of food Technologists Annual Meeting, Orlando, Fla. (1997).

T. Ha et al., "Extrusion processing of zein-based biodegradable plastics," Abstracts from the Sixteenth Annual Midwest Food Processing Conference, IFT Regional Conference, LaCrosse, Wis. (1997).

F. X. B. Santosa et al., "Tensile and water absorption properties of zein-fatty acid biodegradable resins," Abstracts from the Sixteenth Annual Midwest Food Processing Conference, IFT Regional Conference, LaCrosse, Wis. (1997).

T. Ha et al., "Extrusion processing of zein-based biodegradable plastics," Book of Abstracts, Institute of Food Technologists Annual Meeting, Atlanta, Ga. (1998).

F. X. B. Santosa, "Thermal behavior of zein sheets plasticized with oleic and linoleic acids," Book of Abstracts, Institute of Food Technologists Annual Meeting, Atlanta, Ga. (1998).

H. M. Lai et al., "Structure characterization of biodegradable zein resin films by x-ray diffraction," Book of Abstracts, Institute of Food Technologists Annual Meeting, Atlanta, Ga. (1998).

M. T. Izzo et al., Cereal Chem., 66, pp. 47–51 (1989).

J. L. Kanig et al., J. Pharm. Sci., 51(1), p. 77 (1962).

J. W. Park et al., J. Food Sci., 59(4), pp. 916–919 (1994).

The above publications show that there is a long-standing need for biodegradable articles of manufacture, like food packaging materials and disposable consumer goods. Such articles of manufacture typically are prepared from sheets or films of a resin. Although abundant biodegradable materials, like zein, are available for such articles of manufacture, no practical method of preparing commercial quantities of zein-based articles presently exists. The present-day methods of preparing zein-based sheets and films, like casting, are not amenable to providing articles of manufacture due to practical limitations, for example, an inability to form uniform sheets of a desired, predetermined thickness, or an inability to form a commercial quantity of the film in a practical time frame. The present invention is directed to a method of preparing biodegradable sheets, films, and formed products from a zein-based resin, and thereby overcoming the disadvantages of prior casting and cold-rolling methods. The films, sheets, and formed products can be made in commercial quantities and in practical time frames using the present method of manufacture.

SUMMARY OF THE INVENTION

The present invention is directed to an improved method of preparing sheets from a biodegradable resin containing corn zein and a fatty acid. The corn zein-based sheets then can be used in the manufacture of biodegradable films and disposable articles of manufacture. More particularly, the present invention is directed to an improved method of preparing sheets, films, and formed products from a zein-based resin that includes the step of applying heat and/or pressure to a zein resin to provide a biodegradable article having improved physical and esthetic properties.

Therefore, one aspect of the present invention is to provide a method of preparing biodegradable articles of manufacture. The articles of manufacture are prepared from sheets of a wet zein resin, and are used in food packaging applications and as disposable plates, utensils, and related disposable consumer goods.

Another aspect of the present invention is to provide an improved method of manufacturing sheets, films, and formed products from a zein resin comprising corn zein, about 20 to about 100 parts by weight of a $C_8$–$C_{22}$ fatty acid, per 100 weight parts of zein, and optional ingredients.

Yet another aspect of the present invention is to provide an improved method of manufacturing biodegradable films, sheets, and formed products from a zein resin having improved properties, said method including the steps of optionally grinding a cold-rolled sheet of a dried zein-based resin to form granules or a powder; forming the cold rolled sheet, or the granules or powder, to a thin film, or alternatively into pellets or a formed product. The pellets then can be formed into a sheet, film, or formed products. In accordance with the present invention, a sheet or film formed by either of the above alternative methods is subjected to a hot rolling step, a hot pressing step, or a thermoforming step to provide a zein-based resin article of manufacture having improved physical and esthetic properties.

These and other novel and nonobvious aspects of the present invention will become apparent from the following detailed description of the preferred embodiments, taken in conjunction with the drawing.

DETAILED DESCRIPTION OF THE PREFERRED EMBODIMENT

Commodity, petroleum-based plastics are not degraded by natural decaying processes, and, therefore, accumulate and pollute the environment. Even when properly discarded, commodity plastics create a problem by significantly increasing the volume of solid waste.

The following table summarizes current methods used to minimize the environmental impact of biodegradable and nonbiodegradable plastics, and the disadvantage of each method.

| Method | Disadvantages |
| --- | --- |
| Incineration | Adds to air pollution and acid rain; suitable locations for incinerators are difficult to identify and regulatory approval is difficult to obtain. |
| Reuse and recycling | Recycled products cannot be used for medical and food uses due to sanitation problems; the cost of collection and transportation is relatively high. |
| Degradable plastics (in general) | The types and quantities of degradable plastics are limited due to technical and economic problems in manufacturing. |
| Partially degradable plastics | These mixed blends of photodegradable and biodegradable materials and nondegradable materials leave nondegradable residues. |
| Completely degradable | a. Synthetic, biodegradable products, such as polyethylene adipic acid and polycaprolactone, have major problems with respect to control of processing parameters and biodegradability. |
|  | b. Products derived from natural polymers, typically starch, present performance problems due to lack of adequate mechanical properties and high moisture sensitivity. |
|  | c. Products derived from microorganisms, like polyhydroxybutyrate, polyhydroxyvalerate, polyamino acids, and polylactic acid, are fermentation products that require sophisticated and costly production and control systems. |
|  | d. Products derived from biological materials, like zein, are produced by casting a solution on flat inert surfaces and peeling off the resulting film. This production method is not easily scalable and it is limited to thin films. |

Accompanying an ever-increasing public concern over environmental issues is an ever-increasing demand for environment-friendly "plastics" that overcome at least some of the problems associated with petroleum-based plastics. As discussed above, biodegradable zein resins, which are derived from abundant and renewable sources, have the potential to fill the role of a low environmental impact plastic material.

However, problems exist with respect to providing a practical method of manufacturing articles of manufacture from such environmentally compatible materials. In particular, no practical method of forming zein resin films or sheets, which in turn are used to prepare articles of manufacture, presently exists.

The improved method of the present invention utilizes zein-based resins to prepare plastic-like sheets that can be converted to biodegradable films and articles of manufacture, like packaging materials and disposable food service ware. Zein resin products prepared by the present method are biodegradable and exhibit sufficient mechanical, esthetic, and water-resistance properties to allow them to perform their intended function. Zein resins also have the advantages of being prepared from an inexpensive, renewable, and abundant feedstock, and the present preparation methods are readily scalable to commercial quantities.

In particular, zein resins used in the present method have the advantages of: (a) comprising natural products from agricultural feedstocks and listed by the U.S. Food and Drug Administration as Generally Recognized as Safe (GRAS), and (b) are fully biodegradable by native soil microflora. Sheets and films prepared from zein-based resins by the present method are flexible and heat sealable, and have excellent physical and esthetic properties.

The present method provides films and sheets for the manufacture of zein-based articles of manufacture, including environmentally compatible packaging materials and disposable food service ware, which eliminates the need for sorting nondegradable materials from food residues before composting. The present method also allows the manufacture of "breathable" splash-resistant sheets, and environmentally compatible disposable diaper backings.

Figure 1:
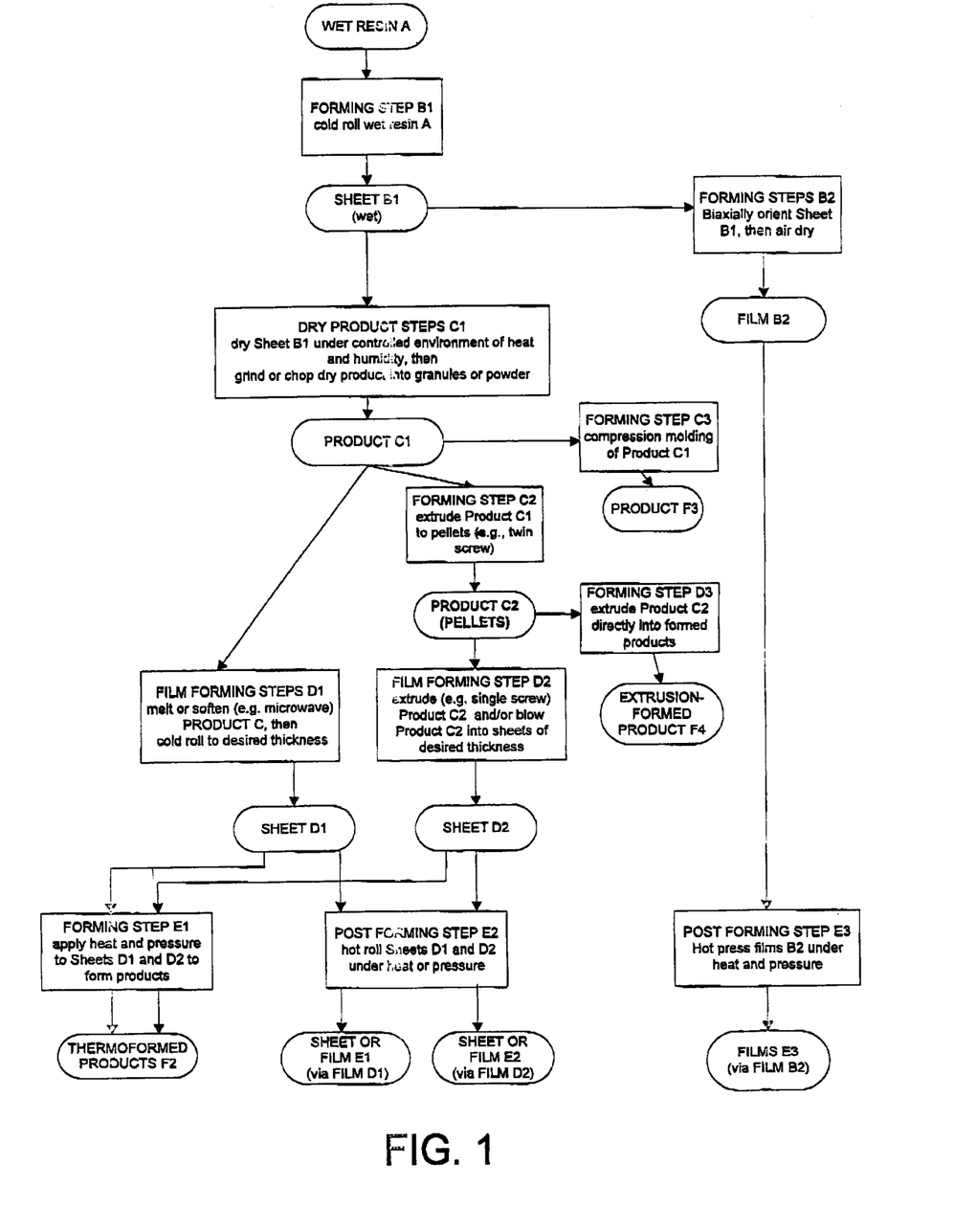
FIG. 1 is a flow chart illustrating alternative methods of preparing the improved corn zein resin sheets, films, and formed products of the present invention.

Embodiments of the present method of manufacturing a zein-based film, sheet, or article of manufacture having improved physical and esthetic properties are illustrated in FIG. 1. The first step in any embodiment of the present method is preparation of a wet zein-based resin, i.e., WET RESIN A. The wet zein resin is prepared by admixing the individual ingredients present in the resin.

A zein resin useful in the present invention comprises corn zein, about 20 to about 100 parts by weight of a $C_8$–$C_{22}$ fatty acid per 100 weight parts of corn zein, and optional ingredients. The source or grade of corn zein is not limited, and any commercial corn zein can be used in the present method. A nonlimiting example of a useful corn zein is regular grade zein F4000, available from Freeman Industries, Inc., Tuckahoe, N.Y.

The $C_8$–$C_{22}$ fatty acid present in the zein resin can be a solid acid or a liquid acid. Similarly, the fatty acid can be a saturated acid or an unsaturated acid. The fatty acid preferably is a liquid fatty acid, because liquid fatty acids have the additional benefit of plasticizing the resulting zein resin.

Liquid fatty acids typically are unsaturated fatty acids containing one to three carbon—carbon double bonds. Preferred unsaturated fatty acids contain one carbon—carbon double bond. It should be understood, however, that unsaturated solid fatty acids also can be used as a component of the zein resin. The choice of fatty acid present in the zein resin is related to the ultimate end use of the zein resin, i.e., the identity of the article of manufacture prepared from the resin film. For example, when selecting a fatty acid, a saturated acid generally provides a rigid, opaque film, whereas an unsaturated fatty acid provides a flexible, translucent film.

Accordingly, suitable $C_8$–$C_{22}$ fatty acids include, but are not limited to, saturated fatty acids, for example, capric acid, lauric acid, myristic acid, caprylic acid, coconut oil fatty acid, palmitic acid, stearic acid, behenic acid, undecylic acid, pentadecylic acid, margaric acid, and arachidic acid, and corn fatty acids. Unsaturated fatty acids include, but are not limited to, oleic acid, linoleic acid, erucic acid, linoleic acid, linolenic acid, palmitoleic acid, eleostearic acid, and mixtures thereof. Substituted $C_8$–$C_{22}$ fatty acids include ricinoleic acid and vernolic acid.

Additional fatty acids include, but are not limited to, cottonseed fatty acid, coconut fatty acid, menhaden acid, tallow acid, hydroxystearic acid, isostearic acid, linseed fatty acid, pelargonic acid, soy fatty acid, tall oil fatty acid, tallow fatty acid, and undecylenic acid. Preferred fatty acids are palmitic acid, stearic acid, and oleic acid. Oleic acid is the most preferred $C_8$–$C_{22}$ fatty acid for use in the zein resin.

The wet resins are prepared by methods known in the art. In this compounding method, corn zein first is solubilized in an aqueous alcohol solution. Typically, the aqueous alcohol solution is aqueous ethanol (70% v/v) or isopropyl alcohol (80% v/v). The identity of the alcohol is not limited as long as the alcohol is soluble in or miscible with water, is capable of solubilizing zein, and has a sufficiently high vapor pressure to readily and essentially completely evaporate from the zein resin.

The zein, therefore, can be solubilized in a warm aqueous alcohol solution (e.g., about 50° C. to about 70° C.). After solubilization of the zein is complete, a liquid or melted-fatty acid is added to the zein solution, with stirring, in an amount of about 20 to about 100 parts, and preferably about 40 to about 100 parts, by weight per 100 weight parts of zein. The resulting mixture is stirred at a moderate speed until the fatty acid is homogeneously dispersed in the zein solution, and the zein-fatty acid resin is formed. During formation of the zein resin, stirring and the rate of addition of fatty acid are controlled to avoid gel formation.

After formation of the zein-fatty acid resin, hereinafter referred to as the "zein resin," the resin is precipitated from the aqueous alcohol solution by the addition of cold water (e.g., 4° C.) to the aqueous alcohol solution. The precipitated zein resin then is washed with additional portions of cold water. The washed zein resins then are kneaded.

When precipitated, the resin is tacky due to the presence of the aqueous alcohol solvent in the resin. Kneading of the zein resin assists removal of the alcohol and water solvents from the resin. Kneading is continued for a sufficient amount of time to provide a moldable, semisolid zein resin, having the consistency of a dough. Preparation of a zein-oleic acid resin by the above general method is disclosed in H. M. Lai et al., *Cereal Chem.*, 74(6), pages 771–775 (1997) and H. M. Lai et al., *Cereal Chem.*, 75(2), pages 194–199 (1997), each incorporated herein by reference.

Corn zein by itself provides a sticky, taffy solid that is difficult to handle and yields brittle films. The addition of a fatty acid to zein provides a zein resin that is a workable semisolid. When forming the zein resin, no chemical reaction occurs between the zein and fatty acid, but there is a physical interaction between the zein and fatty acid.

Optional ingredients also can be included in the zein resin. The optional ingredients can be added to the aqueous alcohol at any convenient time prior to precipitation of the zein resin. Optional ingredients are present in an amount of 0% to about 20%, by weight, of the resin in total. Individual optional ingredients are present in a sufficient amount to perform their intended function, typically 0% to about 5%, and preferably 0% to about 2%, by weight of the resin.

Optional ingredients include, but are not limited to, dyes, fillers, antioxidants, additional plasticizers, emulsifiers, and other compounds that impart a beneficial property to the zein resin, e.g., more facile handling or improved film properties, like enhanced water resistance. Examples of optional ingredients include organic and inorganic dyes to impart a color to the zein resin films and sheets. Fillers, like titanium dioxide, can be added to the zein resin to impart opacity and/or strength to the zein resin sheets and films. Other optional ingredients include known zein plasticizers and antioxidants.

As illustrated in FIG. 1, the wet resin, i.e., WET RESIN A, is subjected to a cold rolling step (FORMING STEP B1) to provide a wet zein resin sheet (SHEET B1). Wet SHEET B1 generally has a thickness of about 0.5 to about 2.5 mm. The preparation of SHEET B1 is disclosed in H. M. Lai et al. *Cereal Chem.*, 74(1), pages 83–90 (1997).

Wet SHEET B1 can be subjected to FORMING STEPS B2 to biaxially orient wet SHEET B1. The resulting sheet then is air dried. Wet SHEET B1 can be biaxially oriented by stretching SHEET B1 over a form, then allowing the resulting biaxially oriented sheet to air dry and form FILM B2. Optionally, wet SHEET B1 can be blown into a FILM B2, then air dried.

In the stretching technique to form SHEET B1 into FILM B2 by FORMING STEPS B2, sheet B1, as it leaves the cold rolls, is gripped by two divergent sets of clips and moved forward at gradually increasing speed while being stretched transversely by the divergent grips. This operation is performed using a tenter frame wherein the clips are moved by a screw of increasing pitch. The magnitude of the transverse draw is controlled by the angle of divergence of the clips. The magnitude of the forward draw depends on the rate of pitch increase. The stretch ratio typically is about 4:1 to about 8:1. As it leaves the tenter frame, the film is dried in a forced convection air dryer to provide FILM B2.

FILM B2 then is subjected to POST FORMING STEP E3 in which FILM B2 is hot pressed under heat and pressure to form FILM E3. FILM B2 is subjected to a pressure of about 150 to about 400 psi, and preferably about 200 to about 300 psi, and a temperature of about 90° C. to about 175° C., and preferably about 100° C. to about 150° C., to form FILM E3. Typically, POST FORMING STEP E3 is performed at about 250 psi and 120° C.

Surprisingly, POST FORMING STEP E3 imparts the following improved properties to FILM B3 over FILM B2:

(i) increased uniformity;

(ii) increased transparency;

(iii) increased resistance to splash water;

(iv) decreased water vapor permeability, e.g., about 10% decrease;

(v) decreased oxygen permeability, e.g., about 3.6 times; and (vi) decreased carbon dioxide permeability, e.g., about 2.8 times.

Wet SHEET B1 also can be subjected to DRY PRODUCT STEPS C1, which first includes drying wet SHEET B1, such as in a forced air dryer, under controlled heat and humidity conditions, e.g., at a temperature of about 40° C. to about 90° C., and preferably at about 50° C. to about 75° C., and at about 5% to about 20%, preferably about 5% to about 10%, relative humidity for about 10 to 16 hours, typically about 12 hours. In this drying step, temperatures above about 90° C. are avoided because physical interactions between the zein and fatty acid can be disrupted, and the zein resin can separate into its zein and fatty acid components. The zein then will shrink into a hard mass. Separation of the fatty acid from the zein is avoided because the beneficial properties of the zein resin are lost.

After controlled drying, SHEET B1 of the zein resin is comminuted, for example, optionally is ground or milled using a hammer mill to provide a zein resin powder or small, relatively uniform granules of zein resin having a particle size of about 0.5 to about 0.85 mm (millimeters) in diameter. For improved processing of the powder or granules in later method steps, it is preferred that the powder or granules have a relatively uniform size. The resulting powder or granules, i.e., PRODUCT C1, then is subjected to further processing steps.

In one embodiment, PRODUCT C1 is compression molded in a FORMING STEP C3 to form PRODUCT F3. Compression molding is performed under the same conditions as POST FORMING STEP E3. PRODUCT F3 exhibits the same improved properties as FILM E3.

In another embodiment, PRODUCT C1 is extruded or otherwise shaped to form PRODUCT C2 pellets. Extrusion can be performed, for example, in a twin screw extruder. In particular, PRODUCT C1 is extruded in a twin-screw extruder having an orifice die and compression elements present in the screw configuration sufficient to provide a die pressure of about 300 to about 750, preferably about 400 to about 600, and most preferably about 500 to about 550, psi (pounds per square inch).

During extrusion, a solvent, for example, aqueous ethanol (70% v/v), is added in an amount of about 5% to about 20%, preferably about 8% to about 15%, and most preferably about 9% to about 12%, based on a weight of solvent to weight of dry zein resin. The solvent facilitates extrusion of the zein resin. During extrusion, the temperature profile in the extruder typically is approximately as follows: 40° C.–80° C.–120° C.–110° C.–100° C. Similar to the controlled drying step to provide PRODUCT C1, the temperature during extrusion is maintained sufficiently low to avoid separation of the zein resin to its component parts.

The zein resin extrudate is comminuted to form pellets, i.e., PRODUCT C2. The pellets have a cross sectional shape that is identical to the shape of the die, e.g., pellets of a cylindrical cross section for a circular die. The pellets typically have a cross section of about 4 to about 5 mm in width, and a length of about 2 to about 3.5 mm. Like PRODUCT C1, PRODUCT C2 can be used to form articles of manufacture.

PRODUCT C2 then can be extruded in FORMING STEP D3 to directly form EXTRUSION FORMED PRODUCT F4. FORMING STEP D3 is performed under the same conditions as POST FORMING STEP E3 to impart the same improved properties to EXTRUSION FORMED PRODUCT F4. PRODUCT F4 can be a film or sheet for use in food packaging applications. Alternatively, PRODUCT C2 can be extruded to provide EXTRUSION FORMED PRODUCT F4, which can have a more complex shape for use as an article of manufacture, i.e., food service ware.

In another embodiment, PRODUCT C2 is subjected to a FILM FORMING STEP D2 in which the pellets of zein resin (i.e., PRODUCT C2) are extruded and/or blown into sheets of desired thickness (i.e., SHEET D2). In this process step, PRODUCT C2 is extruded or blown to provide sheets of zein resin of a desired, predetermined thickness, i.e., SHEET D2. In FORMING STEP D2, PRODUCT C2 is extruded into flat ribbons (SHEET D2) using a single screw extruder with a slit die. The extruder is operated at a screw speed of about 50 to about 100 rpm, and typically at a temperature profile of about 60° C.–90° C.–110° C.

The ribbon of extruded zein resin, i.e., SHEET. D2, has a predetermined thickness that essentially corresponds to the height of the slit die. SHEET D2 typically has a width of about 4 to about 6 cm (centimeters), and typically has a thickness of about 1 to about 2 mm. The thickness of SHEET D2 is not limited because very thin gauge sheets or relatively thick gauge sheets can be manufactured, depending upon the desired end use of the biodegradable zein resin sheet or film, by using an appropriately sized die.

SHEET D2 also can be formed by a well-known blowing technique, wherein compressed air is used to blow softened PRODUCT C2 pellets into a SHEET D2 of predetermined thickness.

SHEET D2 then is subjected to a POST FORMING STEP E2 to impart improved properties to SHEET D2, i.e., FILM E2. Typically, SHEET D2 is hot rolled at a temperature of about 80° C. to about 150° C., and preferably about 100° C. to about 150° C. Hot pressing is performed at a pressure of about 250 to about 500 psi, and preferably about 300 to about 400 psi, for about 2 to about 7 minutes.

The benefits of POST FORMING STEP E are described above, including improved film properties, and a more uniform film thickness. If desired, the hot rolling or hot pressing STEP E2 also can further reduce the thickness of the zein resin SHEET D2 to form FILM E2.

Alternatively, SHEET D2 can be subjected to FORMING STEP E1 in which heat and pressure are applied to SHEET D1 to provide THERMOFORMED PRODUCTS F2. As used herein, the term "thermoformed" is defined as subjecting the dried zein resin, in the form of a sheet, powder, granule, or pellet, to sufficient heat and pressure to form an article of manufacture, without disrupting the physical interactions between the corn zein and fatty acid in the resin.

An important and unexpected property of PRODUCT C1, C2, F2, F3, and F4, and SHEETS AND FILMS E1, E2, and E3, is the stability of these dry products and the retention of the advantageous properties of a zein resin. In particular, WET RESIN A is not stable over long storage periods because zein in a wet form is subject to contamination. WET RESIN A, therefore, requires refrigeration, but contamination then is merely retarded and not eliminated. In commercial-scale applications, it is impractical to use WET RESIN A because of the cost, additional capital equipment, and additional labor required to handle and store large, refrigerated quantities of WET RESIN A. WET RESIN A is too unstable and subject to contamination to allow the direct industrial scale manufacture of zein resin films and sheets. Zein resin PRODUCT C1 and PRODUCT C2 can be stored for long periods without contamination and degradation.

The retention of the advantageous properties of a zein resin in PRODUCT C1, C2, F2, F3, and F4, and SHEETS AND FILMS E1, E2, and E3 is unexpected because drying of zein resins at an elevated temperature typically leads to zein resin separation, and a loss of the beneficial properties provided by a zein resin compared to zein. As illustrated hereafter, the formation of PRODUCT C1, C2, F2, F3, and F4, and SHEETS AND FILMS E1, E2, and E3, allows the commercial-scale formation of zein resin films, sheets, and articles of manufacture from zein resin sheets.

An important aspect of the present invention is providing dry zein resin PRODUCT C1 and PRODUCT C2 for use in the manufacture of articles. Until the present invention, it has been difficult to impossible to subject zein resins to process steps of drying, heating, and pressure without a loss of the beneficial properties provided by the zein resin. Surprisingly, the PRODUCT C1 and PRODUCT C2 retain the beneficial properties of a zein resin, and the properties are retained in subsequent process steps using heat and pressure.

As an additional advantage, zein producers, like corn processors, can readily adapt current processing equipment to manufacture PRODUCT C1 and PRODUCT C2. Such product forms are preferred by manufacturers of sheets, films, and formed products, for example, in the production of food packaging materials.

In another alternative embodiment, PRODUCT C1 is subjected to FILM FORMING STEPS D1, in which PRODUCT C1 first is admixed with an approximately equal weight amount of a solvent, for example 70% v/v aqueous ethanol or isopropyl alcohol. The resulting mixture is heated, for example, is subjected to microwave energy, for a sufficient time to form a soft mass.

If necessary, the soft mass can be cooled to a sufficient temperature to permit cold rolling of the mass to a desired predetermined thickness, and thereby provide SHEET D1. SHEET D1 can have the same dimensions as previously described SHEET D2. SHEET D1 can be formed directly to THERMOFORMED PRODUCT F2 in FORMING STEP E1 by the application of heat and pressure in a thermoforming step, as in the preparation of PRODUCT F3 and PRODUCT F4.

SHEET D1 also can be subjected to a POST FORMING STEP E2 by hot rolling or hot pressing SHEET D1 to impart improved properties to SHEET D1, i.e., FILM E1. Typically, SHEET D1 is hot rolled at a temperature of about 60° C. to about 120° C., and preferably about 80° C. to about 100° C. Hot pressing is performed using a press at a pressure of about 250 to about 500 psi, and preferably about 300 to about 400 psi, for about 2 minutes to about 7 minutes. The benefits of POST FORMING STEP E are described above with respect to FILM E2.

Zein resin SHEETS OR FILMS E1, E2, and E3, if desired, then can be formed (e.g., thermoformed) into biodegradable articles of manufacture having a complex three-dimensional shape, for example, disposable consumer goods, such as disposable plates, disposable containers, disposable utensils, disposable glassware, and similar goods. The zein resin SHEETS AND FILMS E1, E2, and E3 also can be used without further processing for food packaging.

As illustrated above, the present invention provides a commercially practical method of converting zein resins into environmentally compatible films, sheets, and other articles of manufacture. Using the present methods, zein resins can be used to manufacture sheets and films of a desired, predetermined thickness. Zein resin sheets of appropriate thickness then can be formed into articles of manufacture, e.g., shallow trays for food packaging or into disposable food-service plates and bowls. Zein resin films or sheets of a thin gauge can be used for manufacture of garbage and grocery bags. Zein resin films of a thin gauge also can be used as wrapping films for pallet packaging.

The present method of producing zein resin sheets, films, and articles of manufacture provide improvements over films, sheets, and articles manufactured from other materials and over zein films prepared by other methods. The following table summarizes present-day products and materials, including their limitations, and the advantages provided by zein resin articles prepared by the present methods.

| Existing Products | Limitations | Zein Resins |
| --- | --- | --- |
| Commodity plastics | Nondegradable | Fully biodegradability |
| Fermentation products | Lengthy purification process | Quick production process |
| Starch products | Water sensitivity, brittle | Decreased water sensitivity, decreased brittleness |
| Zein films prepared by solution casting | Production process not easily scalable, limited range of thickness gauge, limited mechanical and water resistance | Increased mechanical and water resistance properties, scalable manufacturing process, ability to manufacture wide range of thickness gauges |

To illustrate the improved properties provided by a Zein resin film prepared in accordance with the present invention, a sheet of zein resin, containing zein, about 70 parts by weight oleic acid per 100 parts of zein was prepared according to the following process steps:

WET RESIN A→SHEET B1→PRODUCT C1→
PRODUCT C2→SHEET D2→FILM E2.

The sheet of zein resin had a thickness of about 0.6 mm, and was about 20 cm wide.

The zein resin sheet was used as a wrap for hay bales. The wrapped hay bales were stored outdoors for about six months. The zein resin sheet protected the hay during the entire test. The zein resin sheet softened in the daytime heat, and reversibly hardened in the evening. The sheet withstood all weather conditions during the test, and protected the hay bale for a time frame required for such protection. The zein resin sheets exhibited the advantages of being biodegradable, resistant to rodent and insect attack, edible by the cattle, and avoiding the disposal problem associated with prior hay bale wraps manufactured from petroleum-based plastic sheets.

Tests performed on thinner gauge zein resin sheets showed that such thin sheets are more susceptible to effects of moisture, and, therefore, are more rapidly degraded. Accordingly, the useful lifetime of a present zein resin sheet or film can be adjusted by varying the thickness of the film, and/or by coating the sheet with an oil, like linseed oil or tung oil, to reduce the effects of moisture.

Obviously, many modifications and variations of the invention as hereinbefore set forth can be made without departing from the spirit and scope thereof, and, therefore, only such limitations should be imposed as are indicated by the appended claims.

What is claimed is:

1. A method of manufacturing a corn zein resin article comprising:
   (a) forming a wet corn zein resin comprising:
      (i) corn zein, and
      (ii) about 20 to about 100 parts by weight of a fatty acid, per 100 weight parts of the corn zein;
   (b) cold rolling the wet zein resin to provide a wet zein sheet of a predetermined thickness,
   (c) drying the wet zein resin sheet at a temperature of about 40° C. to about 90° C. and a relative humidity of about 5% to about 20% to provide a dry zein resin;
   (d) optionally comminuting the dry zein resin to form particles of the dry zein;
   (e) extruding the dry zein resin of step (c) or step (d) to form pellets of the dry zein resin; and
   (f) subjecting the dry zein resin pellets to a pressure and a temperature of about 80° C. to about 150° C. to provide a zein resin article.

2. The method of claim 1 wherein the subjecting step (f) further comprises extruding.

3. The method of claim 1 wherein the subjecting step (f) further comprises blowing.

4. The method of claim 1 wherein the subjecting step (f) further comprises thermoforming.

5. A method of manufacturing a corn zein resin article comprising:
   (a) forming a wet corn zein resin comprising:
      (i) corn zein, and
      ii) about 20 to about 100 parts by weight of a fatty acid, per 100 weight parts of the corn zein;
   (b) cold rolling the wet zein resin to provide a wet zein resin sheet of a predetermined thickness;
   (c) drying the wet zein resin sheet at a temperature of about 40° C. to about 90° C. and a relative humidity of about 5% to about 20% to provide a dry zein resin;
   (d) optionally comminuting the dry zein resin to form particles of the dry zein;
   (e) subjecting the dry zein resin of step (c) or step (d) to heat and pressure to provide an article.

6. A method of manufacturing a corn zein resin sheet comprising:
   (a) forming a wet corn zein resin comprising:
      (i) corn zein, and
      (ii) about 20 to about 100 parts by weight of a fatty acid, per 100 weight parts of the corn zein;
   (b) cold rolling the wet zein resin to provide a wet zein resin sheet of a predetermined thickness;
   (c) drying the wet zein resin sheet at a temperature of about 40° C. to about 90° C. and a relative humidity of about 5% to about 20% to provide a dry zein resin;
   (d) optionally comminuting the dry zein resin to form particles of the dry zein resin;
   (e) molding the dry zein resin of step (c) or step (d) under heat and pressure to provide a zein resin sheet.

7. The method of claim 6 wherein molding step (e) comprises extrusion, and the zein resin sheet is subjected to a second forming step under heat and pressure to provide an article of manufacture.

8. A method of manufacturing a corn zein resin article comprising:
   (a) forming a wet corn zein resin comprising:
      (i) corn zein, and
      (ii) about 20 to about 100 parts by weight of a fatty acid, per 100 weight parts of the corn zein;
   (b) cold rolling the wet zein resin to provide a wet zein film of a predetermined thickness,
   (c) drying the wet zein resin film at a temperature of about 40° C. to about 90° C. and a relative humidity of about 5 to about 20% to provide a dry zein resin film;
   (d) optionally comminuting the dry zein resin film to form particles of the dry zein resin;
   (e) heating the dry zein resin particles of step (c) or the zein resin film of step (d) at a sufficient temperature for a sufficient time to melt the dry zein resin particles and form a zein resin mass;
   (f) cold rolling the zein resin mass to provide a zein resin sheet of a predetermined thickness; and
   (g) subjecting the zein resin sheet to a temperature of about 60° C. to about 120° C. and to a pressure to provide the article.

9. The method of claim 8 wherein subjecting step (g) comprises hot rolling.

10. The method of claim 8 wherein subjecting step (g) comprises hot pressing.

11. The method of claim 8 wherein subjecting step (g) comprises thermoforming.

12. A method of manufacturing a corn zein resin article comprising:
   (a) forming a wet corn zein resin comprising:
      (i) corn zein, and
      (ii) about 20 to about 100 parts by weight of a fatty acid, per 100 weight parts of the corn zein;
   (b) cold rolling the wet zein resin to provide a wet zein resin sheet of a predetermined thickness;
   (c) drying the wet zein resin sheet at a temperature of about 40° C. to about 90° C. and a relative humidity of about 5% to about 20% to provide a dry zein resin;
   (d) comminuting the dry zein resin to form particles of the dry zein;
   (e) forming the dry zein resin of step (d) under heat and pressure into an article.

13. A method of manufacturing a corn zein resin pellet comprising:
   (a) forming a wet corn zein resin comprising:
      (i) corn zein, and
      (ii) about 20 to about 100 parts by weight of a fatty acid, per 100 weight parts of the corn zein;
   (b) cold rolling the wet zein resin to provide a wet zein sheet of a predetermined thickness;
   (c) drying the wet zein resin sheet at a temperature of about 40° C. to about 90° C. and a relative humidity of about 5% to about 20% to provide a dry zein resin;
   (d) optionally comminuting the dry zein resin to form particles of the dry zein;
   (e) extruding the dry zein resin of step (c) or step (d) to form the pellet.

14. A method of forming a dry zein resin powder comprising:
   (a) forming a wet corn zein resin comprising:
      (i) corn zein, and
      (ii) about 20 to about 100 parts by weight of a fatty acid, per 100 weight parts of the corn zein;
   (b) cold rolling the wet zein resin to provide a wet zein sheet of a predetermined thickness;
   (c) drying the wet zein resin sheet at a temperature of about 40° C. to about 90° C. and a relative humidity of about 5% to about 20% to provide a dry zein resin;

(d) comminuting the dry zein resin to form the dry zein resin powder.

15. A method of manufacturing a corn zein resin article comprising:
    (a) forming a wet corn zein resin comprising:
        (i) corn zein, and
        (ii) about 20 to about 100 parts by weight of a fatty acid, per 100 weight parts of the corn zein;
    (b) cold rolling the wet zein resin to provide a wet zein sheet of a predetermined thickness;
    (c) drying the wet zein resin sheet at a temperature of about 40° C. to about 90° C. and a relative humidity of about 5% to about 20% to provide a dry zein resin;
    (d) optionally comminuting the dry zein resin to form particles of the dry zein;
    (e) forming the dry zein resin of step (c) or step (d) into an article.

16. The method of claim 15 wherein the step (e) of forming comprises:
    (i) melting or softening the dry zein resin of step (c) or step (d) and cold rolling the melted or softened dry zein resin to form a sheet;
    (ii) applying heat and pressure to the sheet of step (i) to form the article.

17. The method of claim 15 wherein the step (e) of forming comprises:
    (i) extruding the dry zein resin of step (c) or step (d) into pellets;
    (ii) forming the pellets of step (i) into the article.

18. The method of claim 17 wherein the step (ii) of forming the pellets into the article comprises extruding.

19. The method of claim 17 wherein the step (ii) of forming the pellets into the article comprises:
    (A) extruding the pellets of step (i) into sheets;
    (B) applying heat and pressure to the sheets of step (A) to form the article.

20. The method of claim 17 wherein the step (e) of forming comprises compression molding the dry zein resin of step (c) or step (d) into the article.

21. A method of manufacturing a corn zein resin sheet or film comprising:
    (a) forming a wet corn zein resin comprising:
        (i) corn zein, and
        (ii) about 20 to about 100 parts by weight of a fatty acid, per 100 weight parts of the corn zein;
    (b) cold rolling the wet zein resin to provide a wet zein sheet of a predetermined thickness;
    (c) drying the wet zein resin sheet at a temperature of about 40° C. to about 90° C. and a relative humidity of about 5% to about 20% to provide a dry zein resin;
    (d) optionally comminuting the dry zein resin to form particles of the dry zein;
    (e) forming the dry zein resin of step (c) or step (d) into the sheet or film.

22. The method of claim 21 wherein the step (e) of forming comprises:
    (i) melting or softening the dry zein resin of step (c) or step (d) and cold rolling the melted or softened dry zein resin to form an intermediate sheet;
    (ii) applying heat and pressure to the intermediate sheet of step (i) to form the sheet or film.

23. The method of claim 21 wherein the step (e) of forming comprises:
    (i) extruding the dry zein resin of step (c) or step (d) into pellets;
    (ii) forming the pellets of step (i) into the sheet of film.

24. The method of claim 23 wherein the step (ii) of forming the pellets into the sheet or film comprises:
    (A) extruding the pellets of step (i) into intermediate sheets;
    (B) applying heat and pressure to the intermediate sheets of step (A) to form the sheet or film.

25. A method of manufacturing a corn zein resin film comprising:
    (a) forming a wet corn zein resin comprising:
        (i) corn zein, and
        (ii) about 20 to about 100 parts by weight of a fatty acid, per 100 weight parts of the corn zein;
    (b) cold rolling the wet zein resin to provide a wet zein sheet of a predetermined thickness;
    (c) biaxially orienting the wet zein resin sheet;
    (d) forming the biaxially oriented sheet into the film.

26. The method of claim 25 wherein the step (d) of forming the biaxially oriented sheet into the film comprises air drying the biaxially oriented sheet and hot pressing the air dried sheet to produce the film.

27. The method of claim 25 wherein the step (d) of forming the biaxially oriented sheet into the film comprises:
    (i) blowing the biaxially oriented sheet into an intermediate film;
    (ii) air drying the intermediate film;
    (iii) hot pressing the intermediate film to produce the film.

28. The method of claim 25 wherein the step (c) of biaxially orienting the wet zein resin sheet comprises transversely stretching the wet zein resin sheet.

* * * * *

UNITED STATES PATENT AND TRADEMARK OFFICE
CERTIFICATE OF CORRECTION

PATENT NO. : 6,635,206 B1
DATED : October 21, 2003
INVENTOR(S) : Padua et al.

It is certified that error appears in the above-identified patent and that said Letters Patent is hereby corrected as shown below:

<u>Column 14,</u>
Line 8, after the number "5" please insert the -- % -- sign.
Line 11, delete "(c) or the zein resin" and insert -- (c) or the dry zein resin -- therefor.

Signed and Sealed this

Twenty-ninth Day of June, 2004

JON W. DUDAS
*Acting Director of the United States Patent and Trademark Office*